(12) United States Patent
Dulin

(10) Patent No.: US 6,530,391 B1
(45) Date of Patent: Mar. 11, 2003

(54) TEMPERATURE ACTIVATED VALVE

(75) Inventor: Robert D. Dulin, Kingsbury, TX (US)

(73) Assignee: Research by Copperhead Hill, Inc., Kingsbury, TX (US)

( * ) Notice: Subject to any disclaimer, the term of this patent is extended or adjusted under 35 U.S.C. 154(b) by 0 days.

(21) Appl. No.: 09/682,434

(22) Filed: Aug. 31, 2001

(51) Int. Cl.⁷ .............................. F16K 31/64; E03B 7/12
(52) U.S. Cl. .............................. 137/62; 137/2; 137/79; 137/628; 236/99 R; 236/101 R
(58) Field of Search ........................ 137/59, 62, 630.15, 137/79, 627.5, 628, 629, 2; 236/48 R, 191 R, 102, 99 R; 60/527, 530

(56) References Cited

U.S. PATENT DOCUMENTS

| | | | |
|---|---|---|---|
| 1,067,409 A | 7/1913 | Daniel | |
| 1,153,863 A | 9/1915 | Frank | |
| 1,212,102 A | 1/1917 | Pipe | |
| 1,384,950 A | 7/1921 | Harper | |
| 3,369,556 A | 2/1968 | Allderdice | |
| 3,380,464 A | 4/1968 | Arterbury et al. | |
| 3,439,711 A | * 4/1969 | Sherwood et al. | 137/630.15 |
| 3,446,226 A | 5/1969 | Canterbury | |
| 4,066,090 A | * 1/1978 | Nakajima et al. | 137/62 |
| 4,205,698 A | 6/1980 | Hucks | |
| 4,360,036 A | * 11/1982 | Shelton | 137/62 |
| 4,437,481 A | 3/1984 | Chamberlin et al. | |
| 4,454,890 A | * 6/1984 | Schoenheimer et al. | 137/62 |
| 4,484,594 A | 11/1984 | Alderman | |
| 4,638,828 A | 1/1987 | Barrineau et al. | |
| 4,681,088 A | * 7/1987 | Cromer | 137/62 |
| 4,932,429 A | 6/1990 | Watanabe et al. | |
| 5,275,192 A | 1/1994 | Lawson | |
| 5,715,855 A | 2/1998 | Bennett | |
| 5,730,168 A | 3/1998 | Gordon et al. | |
| 5,785,073 A | 7/1998 | Gordon et al. | |
| 5,947,150 A | 9/1999 | Ryan | |
| 6,003,538 A | * 12/1999 | Smith | 137/62 |
| 6,142,172 A | 11/2000 | Shuler et al. | 137/360 |

FOREIGN PATENT DOCUMENTS

| | | | | |
|---|---|---|---|---|
| JP | 0017269 | * | 2/1983 | 137/62 |
| JP | 61088082 | | 6/1986 | |

* cited by examiner

Primary Examiner—George L. Walton
(74) Attorney, Agent, or Firm—David LeCroy

(57) ABSTRACT

A temperature and pressure sensitive valve is disclosed herein. The valve has a valve piston for regulating flow through the valve, a valve piston guide for directing movement of the piston, the piston guide having one or more passages there through, a thermal element for enabling movement of said piston, and an elongated housing having an anterior and posterior end and an interior wall able to house said piston, guide and thermal element. The housing further has two or more passages able to aid the piston in regulating flow, with at least one of the passages placed towards said anterior end of the housing, and at least one of the passages placed towards said posterior end of the housing.

20 Claims, 4 Drawing Sheets

TEMPERATURE ACTIVATED VALVE

BACKGROUND OF INVENTION

1. Field of the Invention

The present invention relates to valves. More specifically, the present invention relates to a temperature actuated valve that automatically opens in response to freezing temperatures, thereby enabling flow to continue through the valve, and that automatically closes when the temperature rises above freezing.

2. Background Information

Damage often occurs to water pipes and faucets that are externally exposed to freezing conditions due to the expansion of water when it freezes. The most common solution is to crack the faucet open sufficiently enough to allow a slow dripping of the water. This flowing of water is typically warm enough to prevent freezing of the piping upstream of the faucet. The warmer water usually comes from buried pipes at a temperature above freezing at a rate faster than it can be frozen. However, faucet dripping is not always feasible, as no one may be available to open the faucet, the faucet may be forgotten, or the cold weather may be unexpected. Further, this dripping can be wasteful of water in that the faucets often drip longer than is necessary.

As a solution to this concern of frozen pipes and faucets, a multitude of alternatives have been proposed that automatically allow the faucet to drip when freezing conditions are encountered. Typically, these alternatives include a thermally active element utilized in opening and closing various types of valves. Examples of thermally active elements include a combination of materials having differing coefficients of thermal expansion arranged such that one moves in relation to another with a change in temperature, a liquid that condenses at a specific temperature, or a wax that changes phases at a known temperature with a corresponding change in volume. Valves containing such thermal elements are constructed so that movement of the thermal elements enables movement of a plug, thereby opening the faucet and allowing water to drip.

However, many times a hose or other accessory may be attached to the end of the faucet. This accessory may already contain fluid in it that has frozen, causing the outlet of the faucet to be blocked. Accordingly, there is a need for a valve having a secondary means of permitting flow there through in the event that the primary means is prevented from allowing flow there through.

SUMMARY OF INVENTION

The present invention disclosed herein alleviates the drawbacks described above with respect to responding to fluid flow through a valve, particularly in that instance wherein the primary means of permitting fluid flow there through is unable to do so. The valve of the present invention is easily installed in a common water faucet. It allows the control of the flow of the volume of liquid to be unattended, regardless of how low the surrounding air temperature may be. The valve further allows such unattended control, even should the primary means of release, e.g., the outlet of the faucet, be blocked preventing flow there through.

The valve of the present invention is temperature and pressure sensitive and has a valve piston for regulating flow through the valve The valve further has a valve piston guide for directing movement of said piston, with the piston guide having one or more passages there through, a thermal element for enabling movement of the piston, and an elongated housing having an anterior and posterior end and an interior wall able to house the piston, guide and thermal element. The housing also has of two or more passages able to aid the piston in regulating flow, with at least one of the passages placed towards the anterior end of the housing, and at least one of the passages placed towards said posterior end of the housing.

The present invention further provides a method of controlling flow through a faucet in freezing conditions. The faucet has a valve in communication with the faucet, with the valve having a valve housing with an anterior end and a posterior end and an internal wall. The housing houses a valve piston, piston guide, piston seat and thermal element. The thermal element is able to expand and contract according to the surrounding air temperature, and the piston is sealably engaged with the seat. The method comprising the steps of contracting the thermal element as the surrounding air temperature approaches the freezing temperature of water; moving the valve piston towards the anterior end of the housing; and breaking the piston's sealable engagement with the seat, thereby automatically creating a flow passage through the valve. The flow passage through the valve automatically closes as the surrounding air temperature rises above a predetermined temperature.

As designed, the valve of the present invention is easily and conveniently installed in a faucet. Its simple design allows it to be inexpensively manufactured. It may be manufactured in a wide range of sizes, based upon the size of the flow line to be served. By proper selection of materials, the present invention may be used for controlling a wide variety of flow.

The valve of the present invention is comprised of at least two components that enable it to overcome those limitations that are encountered with typical temperature activated valves. These components include a valve piston and one or more valve piston seats that interact with one another to allow or prevent flow through the valve. Each seat communicates with one or more ports for allowing flow there through. The ports are closed when the piston is in contact with the seat, and opened when the piston is disengaged with the seat.

As disclosed herein, the valve is further comprised of a thermal element able to expand and contract based upon variations in temperature. As the element expands and contracts, the piston is moved so that it sequentially engages and disengages with the seat(s), thereby closing and opening the valve seat ports.

Additional ports are positioned on the valve such that flow may automatically continue through the faucet. These additional ports are found in differing locations on the valve. One is positioned so that flow may occur through the valve and faucet in the event of freezing temperatures. In the event that flow through the outlet of the faucet is blocked, e.g., a hose is attached to the outlet blocking flow, or fluid at the outlet is frozen blocking flow, another secondary port is positioned on the valve so that flow can bypass the faucet outlet, avoiding damage due to frozen pipes and/or faucets. By opening these ports, flow through the valve is permitted regardless of surrounding air temperature.

In the manner of the present invention, flow through the first port and out the faucet occurs due to freezing conditions. The secondary port is opened by both temperature and pressure due to the faucet outlet being blocked. The pressure for opening the secondary port may be predetermined by changing the diameter of the piston.

The general beneficial effects described above apply generally to each of the exemplary descriptions and characterizations of the devices and mechanisms disclosed herein. The specific structures through which these benefits are delivered will be described in detail herein below.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention. Although described as built into the stem of the faucet it should be under stood that the valve may be built into the body of the faucet if so desired.

Figure 2:
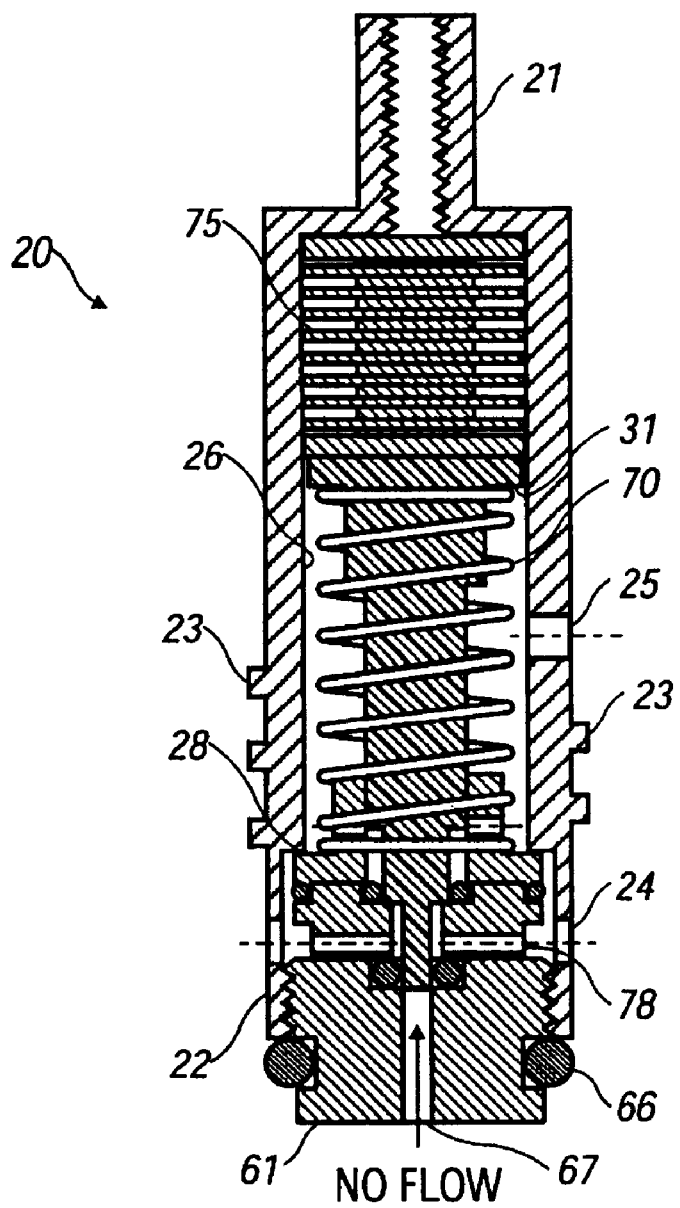
FIG. 2 is a longitudinal cross-sectional view of a flow control valve according to the present invention showing the position of the components with no flow through the valve.
Figure 3:
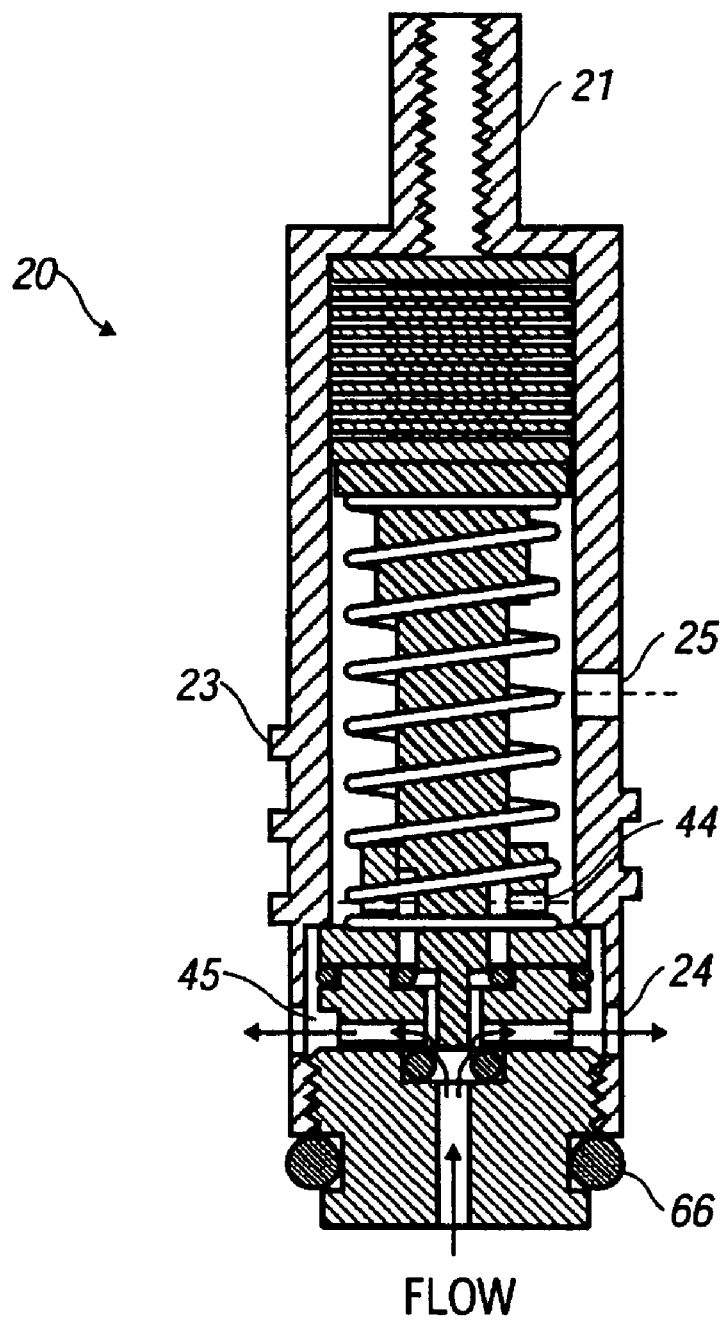
FIG. 3 is a longitudinal cross-sectional view of a flow control valve according to the present invention showing the position of the components with flow through the primary conduit of the valve.
Figure 4:
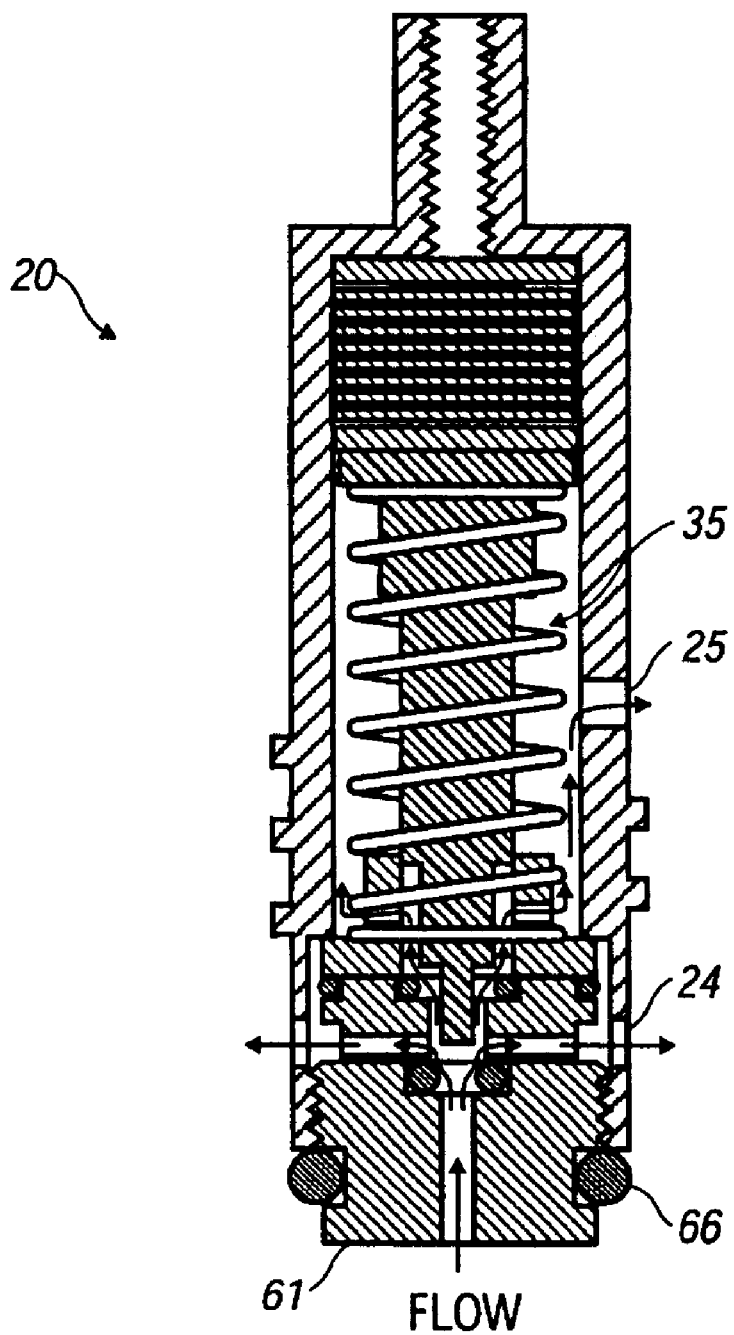
FIG. 4 is a longitudinal cross-sectional view of a flow control valve according to the present invention showing the position of the components with flow through the secondary conduit of the valve.

Referring to the drawings, the temperature-actuated valve of the present invention is indicated generally at 20. The valve or valve housing or valve stem 20 has an anterior end 21 and a posterior end 22, with the posterior end 22 in communication with a faucet body 10. The valve 20 is comprised of a hollow cylindrical housing having external stem threads 23 for communication or secured connection with the faucet body 10. The valve stem 20 may have on or more ports positioned below and/or above the stem threads 23. The ports and their function will be described more fully hereinafter. As illustrated in the embodiment of FIGS. 2–4, the interior of the valve stem is comprised of an upper interior wall 26 and a lower interior wall 27. The function of each wall will likewise be described herein below.

In one embodiment, applied onto and over the anterior end 21 of the valve stem 20 is a valve stem washer 84, valve stem gasket 83, cap or nut 82, handle 80 and screw or bolt 81. The bolt 81 threadably engages with the valve stem anterior end 21 for securely attaching the handle 80 thereto. The valve stem washer 84, gasket 83 and cap 82 provide a means for sealably securing the valve stem 20 to the faucet body 10. The washer 84, gasket 83 and cap 82 have an interior diameter that is slightly larger than that of the valve stem 20 so that they are able to slide over the valve stem to the top of the faucet body 10, where the cap 82 engages with the packing nut external threads 15 of the faucet body 10, thereby providing a seal between the faucet 10 and the valve stem 20 for the prevention of fluid leakage.

The faucet body 10 is tapped at both ends to provide threads 12 and 14 at the valve inlet 11 and outlet 13, respectively. While the drawings illustrate externally threaded inlet 11 and outlet 13 ends, it should be understood that both ends may be either internally or externally threaded. The top central portion of the faucet 10 between the tapped ends is both internally 16 and externally 15 threaded and adapted to threadably receive the valve stem 20 therein. In this manner, the valve stem 20 is able to be manually turned by the handle 80 in order to allow or stop flow through the faucet 10 without the valve stem 20 disengaging with the faucet 10. The faucet body 10 is readily available commercially. Such faucets have a partition therein (not shown) for separating an inlet chamber from an outlet chamber. The valve stem 20 engages with the partition. By rotation of the handle 80, the valve stem is rotated either upwardly increasingly opening flow from the inlet chamber to the outlet chamber and out the faucet 10, or rotated downwardly thereby increasingly limiting and eventually blocking flow through the chambers and out the faucet 10.

Figure 1:
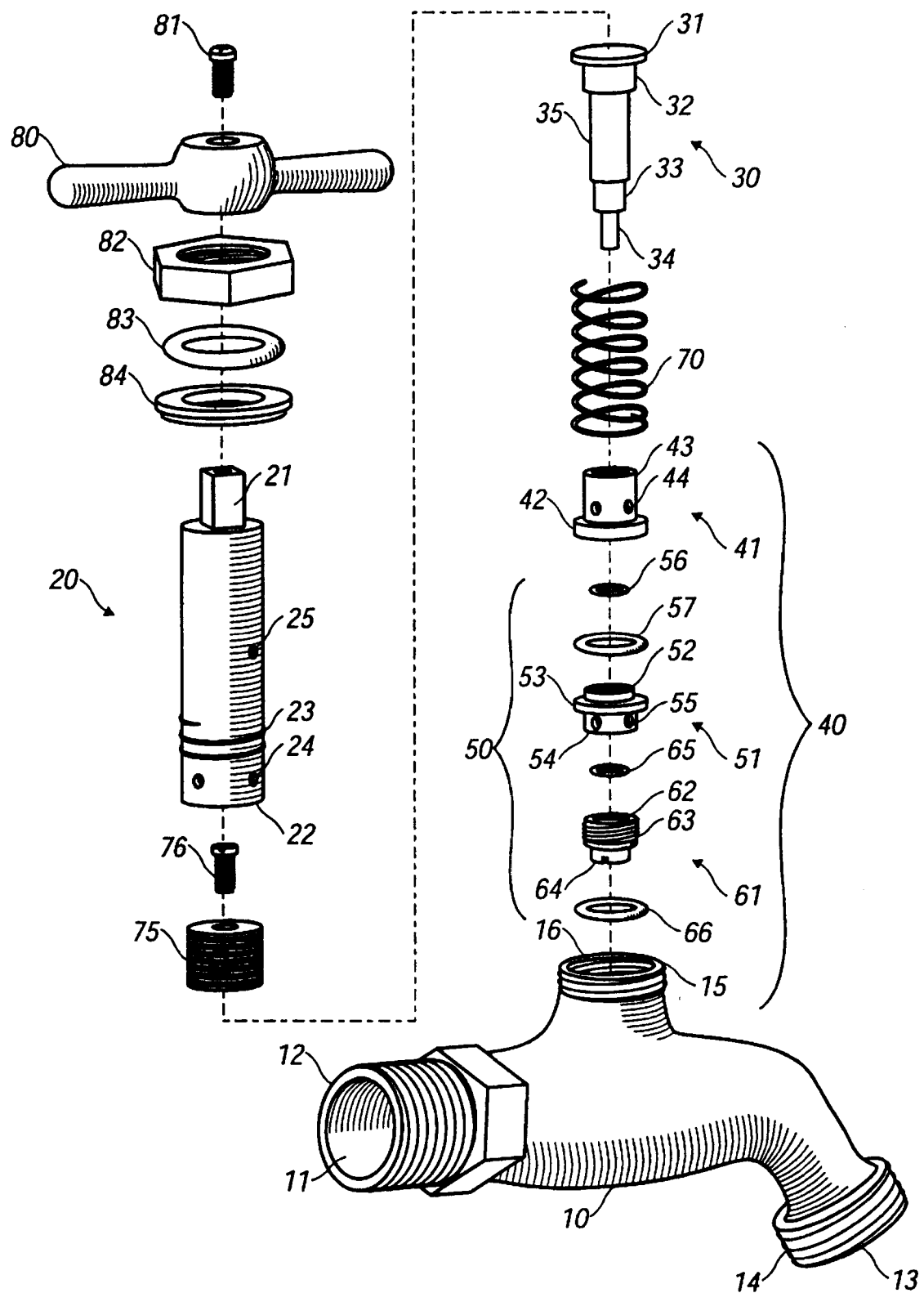
FIG. 1 is an exploded perspective view of a temperature actuated valve according to the present invention.

Disposed within the valve stem 20 is a thermal element 75, valve piston 30, and valve piston guide 40. The thermal element 75 is slightly smaller in external diameter than the upper internal diameter or wall 26 of the valve stem 20, and is able to expand and contract based upon variations in temperature. By being internally disposed in the valve stem 20 between the anterior end 21 and the valve piston 30, the thermal element 75 is able to move the piston 30 along the length of the internal wall of the valve stem 20 as variations occur within a predetermined temperature range. The thermal element 75 is preferably a hollow bellows type device, filled with a substance such as a liquid, gel or gas that expands and contracts based upon changes in temperature. Such an element 75 may be provided with a thermal plug 76 whereby the liquid, gel or gas can be added to the element 75 as needed. In the embodiment illustrated in FIG. 1, it is possible to fill the element 75 by removing first the screw 81 and handle 80 and then the plug 76, accessing the thermal element 75 through the valve stem anterior end 21 without separating all components. While a bellows type element 75 is preferred, one skilled in the art would readily recognize that any type of thermal element 75 that expands and contracts with variations in temperature would serve the purpose of the present invention.

In the embodiment illustrated, the valve piston 30 is comprised of a piston base 31, piston travel stop 32, central portion 35, piston primary terminus 34 and secondary terminus 33, and biasing member 70 such as a spring. The piston base 31 is adjacent to the thermal element 75 and provides a surface for contact with the element 75. The piston stop 32 is of smaller diameter than the biasing member or spring 70, whereas the piston base 31 is of the same or greater diameter than the spring 70. As such, the piston stop 32 provides an area or region for supporting the spring 70 within the valve stem 20. The piston stop 32 serves a further purpose, as will be discussed herein below along with the function of the primary 34 and secondary 33 terminus. Further, the piston base 31 is preferably of slightly smaller diameter than the valve stem upper internal wall 26 so that the piston 30 is slidably disposed therein.

The valve piston seat or guide 40 is comprised of a valve piston guide 41 for directing the piston 30 through the valve stem 20, and a valve piston terminus seat 50 for interaction with the piston terminus 33, 34. The guide 41 has a recess there through and is further comprised of a posterior ridge 42, anterior aperture 43, and one or more guide ports 44. The posterior ridge 42 is of slightly smaller diameter than the valve stem lower interior wall or diameter 27, and is of such width that the guide 41 is slidably yet securely or stably placed therein the valve stem 20. Referring to the embodiment found in FIGS. 2–4, it is seen that the valve stem upper internal wall 26 is of smaller diameter than the lower internal wall 27, thereby creating an internal ridge 28 separating the two areas. As shown, the posterior ridge 42 is substantially larger in diameter than the upper internal wall 26 so that only the anterior end of the guide 41 enters into the upper portion of the interior of the valve stem 20. The central portion 35 of the piston 30 is preferably of at least a slightly smaller diameter than the recess of the guide 41. As such, the piston 30 is placed through the anterior aperture 43 and able to slidably pass through the guide 41 up to the piston stop 32. Thereby, the guide 41 centers the piston 30 within the valve stem 20.

The piston terminus seat 50 interacts with the piston 30 to provide a path for allowing or preventing flow from the faucet 10 through the valve stem 20 as will be explained herein below. In the embodiment illustrated, the piston terminus seat 50 is comprised of a primary terminus seat 61 and secondary terminus seat 51. The secondary terminus seat 51 has a secondary anterior aperture 52, secondary axial ridge 53, secondary posterior aperture 54 in communication with the anterior aperture 52, and one or more secondary ports 55 disposed about the posterior end of the secondary terminus seat 51. The diameter of the axial ridge 53 should be of such size that it is slidably in communication with the lower interior surface or wall 27 of the valve stem 20, thereby enabling the secondary terminus seat 51 to be stably placed within the valve stem 20. The anterior end of the secondary terminus seat 51 is in communication with the posterior end of the piston guide 41.

The secondary terminus seat 51 may have one or more seals or gaskets there about. A secondary exterior seal 57 may be provided that is disposed about or around the anterior end for providing a seal between the guide 41 and secondary terminus seat 51. A secondary interior seal 56 may be provided that is disposed about or just inside the secondary anterior aperture 52 for sealably communicating with the secondary terminus 33 of the piston 30. As such, the secondary interior seal 56 should be of such external diameter that it is able to sealably fit within the secondary anterior aperture 52, and of such internal diameter that it is able to sealably communicate with the valve piston secondary terminus 33.

The primary terminus seat 61 has a primary anterior aperture 62, primary external threads 63 and a primary posterior head 64. The primary threads 63 are engageable with threads internally located at the valve stem posterior end 22 below the primary ports 24, thereby acting as a retainer for keeping the other internal components of the valve stem 20 therein. The primary posterior head 64 may be slotted for engagement with a tool such as a screwdriver, or may be shaped so that it is able to engage with any other tool such as a wrench, thereby allowing one to turn and secure the primary terminus seat 61 within the valve stem 20. The primary posterior head 64 has a recess 67 that is in communication with the primary anterior aperture 62 for allowing fluid flow there through, as illustrated in FIGS. 2–4.

Similar to the secondary terminus seat 51, the primary terminus seat 61 may have one or more seals or gaskets there about. A primary exterior gasket or seal 66 may be provided that is disposed about or around the posterior end for providing a seal between the valve stem posterior end 22 and the faucet body 10. A primary interior seal 67 may be provided that is disposed about or just inside the primary anterior aperture 62 for sealably communicating with the primary terminus 34 of the piston 30. As such, the primary interior seal 67 should be of such external diameter that it is able to sealably fit within the primary anterior aperture 62, and of such internal diameter that it is able to sealably communicate with the valve piston primary terminus 34.

An helical coil spring 70 is disposed at one end substantially concentrically about the piston travel stop 32 with one end abutting one side of the piston base 31 and the other end disposed substantially concentrically about the valve piston guide 41, adjacent to the top portion of the piston guide posterior ridge 42, or that end of the ridge 42 least distal from the piston base 31. When relaxed and extended, the spring 70 extends substantially the length of the piston 30 and piston guide 41, thereby biasing the piston 30 towards the valve stem anterior end 21.

Referring again to the Figures, particularly FIGS. 2–4, the operation of the valve is as follows: With temperatures at or above a predetermined activation temperature, the temperature valve 20 in the embodiment illustrated functions as a common faucet, with fluid flow there through enabled simply by turning the handle 80 so that the valve 20 is lifted up from a partition found within the faucet body 10. By turning in the opposite direction, flow there through is stopped. While at or above this activation temperature, the substance within the thermal element 75 is expanded, thereby expanding the element 75. With the element 75 expanded, the piston 30 is pushed toward the valve stem posterior end 22, so that the secondary terminus 33 engages with the secondary interior seal 56 and the primary terminus 34 engages with the primary interior seal 65, thereby preventing flow through the valve stem 20, preventing flow there through as illustrated in FIG. 2.

As the temperature reaches the activation temperature, the substance within the element 75 begins to contract, thereby allowing the pressure of the spring 70 to push against the piston 30 and, thus, the element 75, causing it to contract and the piston 30 to move away from the valve stem posterior end 22. As the piston 30 moves away, the piston terminus breaks contact from the piston terminus seat 50, allowing flow to occur within the valve stem 20. This break first occurs between the piston primary terminus 34 and the primary terminus seat 61. With the primary terminus 34 no longer engaged with the primary terminus seat 61, flow is able to occur through the primary terminus recess 67, onward through the secondary terminus seat port(s) 55. into a piston seat chamber 45 between the piston seat 40 and the valve stem lower internal wall 27, out the primary port(s) 24, and onward through the faucet body 10 and out its outlet 13. It should be noted that the piston secondary terminus 33 is still engaged with the secondary terminus seat 51, so that flow is prevented from continuing further within the valve stem 20. In this manner, the posterior passage of the valve stem housing 20 provides a primary path for flow to occur and the anterior passage provides a secondary path for flow to occur.

In the event that flow is prevented from continuing out the faucet body outlet 13 while at or below the activation temperature, or in the instance of further temperature decline below the activation temperature, the substance within the element 75 may continue to contract, allowing the spring 70 to continue to expand and push the piston 30 away from the piston seat 40. Another break occurs between the piston secondary terminus 33 and the secondary terminus seat 51 enabling fluid to flow through the piston guide port(s) 44, into a piston chamber 35, and out the valve stem secondary port(s) 25 as illustrated in FIG. 4. Flow may also continue through the valve stem primary port(s) 24. In this manner, the temperature actuated valve provides an alternative or secondary path of fluid flow. In the event that flow through the faucet outlet is block, the valve 20 provides a method of fluid escape without damage to the faucet 10, valve 20 or pipes due to pressure buildup, particularly in inclimate conditions. It should be further noted that both temperature and pressure may open the secondary fluid path. Further, the pressure required to open the secondary path may be predetermined by changing the diameter of the piston secondary terminus 33. In this manner, a larger diameter provides more surface thereby requiring less pressure to open.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

Industrial Applicability.

The present invention finds applicability in the valve industry, and more specifically in automatic flow valves. Of particular importance is the invention's ability to stop damage caused by frozen faucets and pipes.

What is claimed is:

1. A temperature and pressure sensitive valve comprising:
   a valve piston for regulating flow through the valve,
   a valve piston guide in concentric relationship with said piston for directing movement of said piston there through, said piston guide having one or more passages there through, said piston guide being coaxially spaced with said piston
   a thermal element adjacent to a base of said piston and able to contract and expand based upon variations in temperature, thereby enabling movement of said piston so as to regulate flow, said thermal element able to be adjusted so as to define the opening and closing temperatures, and
   an elongated housing having an anterior and posterior end and an interior wall able to house said piston, guide and thermal element,
   wherein said housing is further comprised of two or more passages able to aid said piston in regulating flow, with at least one of said passages placed towards said anterior end of said housing, and at least one of said passages placed towards said posterior end of said housing,
   whereby placement of the said two or more passages provides two flow regulating passages that are sequentially opened based upon the contraction and expansion of said thermal element, thereby providing a secondary flow regulating passage in the event that the primary flow regulating passage is blocked.

2. The valve of claim 1 wherein said piston guide is further comprised of at least one piston seat concentric with said guide about said piston for sealingly engaging with said piston thereby preventing flow there through.

3. The valve of claim 1 wherein said piston guide is further comprised of one or more guide passages for permitting flow there through.

4. The valve of claim 1 wherein said piston is further comprised of at least one terminus for engaging with said piston guide, thereby regulating flow through said valve.

5. The valve of claim 4 wherein said terminus is further comprised of a primary terminus and a secondary terminus for regulating flow through said valve.

6. The valve of claim 5 wherein said piston guide is further comprised of a primary seat able to engage with said primary terminus and a secondary seat able to engage with said secondary terminus, thereby regulating flow through said valve.

7. The valve of claim 1 wherein said posterior passage provides a primary path for flow to occur and said anterior passage provides a secondary pith for flow to occur, whereby when flow through said primary path is blocked, pressure in the valve pushes said piston towards said anterior end of said housing, thereby enabling flow to continue through said secondary path.

8. A temperature and pressure sensitive valve for regulating flow comprising:
   a faucet body for permitting fluid flow there through, said body able to engage with said valve,
   a valve stem housing having a posterior portion connectable to said faucet body and an anterior portion whereby flow through said faucet body is manually adjustable,
   a valve piston having a piston base and a terminus opposite said base,
   a thermal element in communication with said piston base and able to contract and expand based upon variations in temperature, thereby enabling movement of said piston within said housing, and
   a piston guide for longitudinally directing movement of said piston through said housing, said piston guide concentrically and sealingly engageable with said piston, said piston guide comprising one or more guide ports for communicating with said stem housing,
   wherein said valve stem housing is further comprised of at least one primary port towards said posterior portion of said housing and in communication with said faucet body, and at least one secondary port towards said anterior portion of said housing, said primary and said secondary ports being sequentially opened based upon the contraction and expansion of said thermal element, thereby providing a secondary flow path in the event that flow through said at least one primary port is blocked.

9. The valve of claim 8 wherein said thermal element is able to expand and contract with variations in the temperature of the surrounding air, whereby said at least one of said passages placed towards said posterior end of said housing permits flow there through when said thermal element is contracted, and whereby said at least one of said passages placed towards said anterior end of said housing permits flow there through when said thermal element is contracted and flow through said at least one of said passages placed towards said posterior end of said housing is blocked.

10. The valve of claim 8 wherein said thermal element is filled with a substance that expands and contracts based upon changes in temperature.

11. The valve of claim 10 wherein said thermal element is further provided with a plug whereby the substance can be filled as needed.

12. The valve of claim 8 wherein said terminus is further comprised of a primary terminus and a secondary terminus for regulating flow through said valve, said primary terminus allowing flow through said at least one primary port when disengaged with said piston guide, and said secondary terminus allowing flow through said at least one secondary port when disengaged with said piston guide.

13. The valve of claim 8 wherein said piston guide is further comprised of a seat concentric with said guide about said piston and able to sealingly engage with said piston.

14. The valve of claim 8 wherein said piston guide is further comprised of a primary seat and a secondary seat and said terminus is further comprised of a primary terminus and a secondary terminus, said primary seat able to engage with said primary terminus, and said secondary seat able to engage with said secondary terminus, whereby when said primary seat is engaged with said primary terminus, flow is blocked through said at least one primary port and when said secondary seat is engaged with said secondary terminus, flow is blocked through said at least one secondary port.

15. The valve of claim 8 wherein said primary port provides a primary path for flow to occur when said thermal element contracts, and said secondary port provides a secondary path for flow to occur when said thermal element contracts and flow through said primary port is blocked.

16. A method of controlling flow through a faucet in freezing conditions, said faucet having a valve in communication with said faucet, said valve comprising a valve housing having an anterior end and a posterior end and an internal wall for housing a valve piston, piston guide coaxially spaced along said piston, piston seat and thermal element, wherein said thermal element is able to expand and contract according to the surrounding air temperature, and wherein said piston is sealably engaged with said piston seat, said method comprising the steps of:

contracting said thermal element as the surrounding air temperature approaches the freezing temperature of water;

moving said valve piston towards said anterior end of said housing; and breaking said piston's sealable engagement with said seat, thereby automatically creating at least one flow passage through said valve, wherein said posterior end of said housing has at least one primary port for flow passage there through, wherein said anterior end of said housing has at least one secondary port for flow passage there through, said at least one secondary port being sequentially opened with said at least one primary port based upon the contraction and expansion of said thermal element, thereby providing a secondary flow passage in the event that flow through said at least one primary port is blocked when said valve piston moves toward said anterior end of said housing, and wherein said flow passage through said valve automatically closes as the surrounding air temperature rises above a predetermined temperature.

17. The method of claim 16 wherein said valve is further comprised of a biasing member concentric about said piston for moving said piston away from said posterior end as said thermal element contracts.

18. The method of claim 16 wherein said piston is further comprised of at least a primary terminus and a secondary terminus, and said seat is further comprised of a primary terminus seat and a secondary terminus seat, said primary terminus sealingly engagable with said primary seat, and said secondary terminus sealingly engagable with said secondary seat.

19. The method of claim 16 wherein said at least one flow passage is further comprised of at least one posterior passage and at least one anterior passage, further comprising the steps of:

opening flow through said at least one posterior passage when said valve piston moves towards said anterior end of said housing, and opening flow through said at least one anterior passage when said valve piston moves towards said anterior end of said housing and flow through said at least one posterior passage is blocked.

20. The method of claim 19 wherein said at least one posterior passage provides a primary path for flow to occur, and said at least one anterior passage provides a secondary path for flow to occur.

* * * * *